(12) United States Patent
Shin et al.

(10) Patent No.: US 12,065,020 B2
(45) Date of Patent: Aug. 20, 2024

(54) COOLING MODULE

(71) Applicant: Hanon Systems, Daejeon (KR)

(72) Inventors: Sung Hong Shin, Daejeon (KR); Jun Il Jang, Daejeon (KR); Hyuk Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 428 days.

(21) Appl. No.: 17/424,765

(22) PCT Filed: Feb. 10, 2020

(86) PCT No.: PCT/KR2020/001810
§ 371 (c)(1),
(2) Date: Jul. 21, 2021

(87) PCT Pub. No.: WO2020/166903

PCT Pub. Date: Aug. 20, 2020

(65) Prior Publication Data

US 2022/0118826 A1  Apr. 21, 2022

(30) Foreign Application Priority Data

Feb. 11, 2019  (KR) .......... 10-2019-0015607
Feb. 7, 2020   (KR) .......... 10-2020-0014831

(51) Int. Cl.
*B60H 1/32* (2006.01)
*B60K 11/04* (2006.01)
(Continued)

(52) U.S. Cl.
CPC ............ *B60H 1/3227* (2013.01); *B60K 11/04* (2013.01); *F01P 3/18* (2013.01); *F25B 39/04* (2013.01);
(Continued)

(58) Field of Classification Search
CPC .......... B60H 1/3227; B60K 11/04; F01P 3/18; F25B 39/04; F28D 1/0435; F28F 9/002;
(Continued)

(56) References Cited

U.S. PATENT DOCUMENTS 4,899,815 A * 2/1990 Bosch ................... F28F 9/0226
                                                    165/173
5,901,573 A * 5/1999 Kobayashi ........... B60H 1/3227
                                                    62/509
(Continued)

FOREIGN PATENT DOCUMENTS

JP  H07280392 A  * 10/1995
JP  2005186780 A * 7/2005 ........... F28D 1/0435
(Continued)

OTHER PUBLICATIONS

International Search Report issued in PCT/KR2020/001810 on May 21, 2020.

*Primary Examiner* — Claire E Rojohn, III
(74) *Attorney, Agent, or Firm* — Norton Rose Fulbright US LLP; James R. Crawford

(57) ABSTRACT

A cooling module including: a radiator including: first and second header tanks disposed to face each other; and hook parts respectively disposed at upper and lower sides of the first header tank and a lower side of the second header tank; and a condenser including: third and fourth header tanks disposed to face each other; a flange connection part coupled to the third header tank; and a gas-liquid separator coupled to the fourth header tank, in which the condenser is coupled to the radiator as the flange connection part, the third header tank, and the gas-liquid separator are inserted into the plurality of hook parts, respectively, in a direction from an upper side to a lower side thereof.

14 Claims, 16 Drawing Sheets

(51) Int. Cl.
    *F01P 3/18*    (2006.01)
    *F25B 39/04*   (2006.01)
    *F28D 1/04*    (2006.01)
    *F28F 9/00*    (2006.01)
    *F28F 9/013*   (2006.01)
    *F28F 9/02*    (2006.01)
    *F28F 9/26*    (2006.01)

(52) U.S. Cl.
    CPC ............ *F28D 1/0435* (2013.01); *F28F 9/002* (2013.01); *F28F 9/013* (2013.01); *F28F 9/02* (2013.01); *F28F 9/262* (2013.01); *F28F 2255/143* (2013.01)

(58) Field of Classification Search
    CPC .... F28F 9/013; F28F 9/02; F28F 9/262; F28F 2255/143
    USPC ......................................................... 165/144
    See application file for complete search history.

(56) References Cited

U.S. PATENT DOCUMENTS

| | | | | |
|---|---|---|---|---|
| 6,158,500 | A * | 12/2000 | Heine | B60K 11/04 165/140 |
| 6,318,450 | B1 * | 11/2001 | Acre | F28D 1/0435 165/149 |
| 7,175,142 | B2 * | 2/2007 | Brown | F28F 9/007 248/200 |
| 9,733,022 | B2 * | 8/2017 | Wilkins | F28D 1/0435 |
| 10,619,931 | B2 * | 4/2020 | Han | B60H 1/3227 |
| 2002/0073730 | A1 * | 6/2002 | Shibata | F25B 39/04 62/509 |
| 2007/0062671 | A1 * | 3/2007 | Sugimoto | F28D 1/0452 165/140 |
| 2011/0304176 | A1 * | 12/2011 | Kihara | B60K 11/04 29/890.03 |
| 2014/0069608 | A1 * | 3/2014 | Hachmann | F28G 15/02 165/67 |
| 2018/0010865 | A1 * | 1/2018 | Shin | F28F 9/013 |
| 2022/0118826 | A1 * | 4/2022 | Shin | F25B 39/04 |
| 2023/0068291 | A1 * | 3/2023 | Lee | F28D 1/05366 |

FOREIGN PATENT DOCUMENTS

| | | | |
|---|---|---|---|
| KR | 20130101270 A | | 9/2013 |
| KR | 20150068733 A | | 6/2015 |
| KR | 20160026802 A | * | 3/2016 |
| KR | 20160035825 A | | 4/2016 |
| WO | WO-2016036109 A1 | * | 3/2016 ........... B60H 1/3227 |

* cited by examiner

COOLING MODULE

CROSS REFERENCE TO RELATED APPLICATIONS

This application is a national phase under 35 U.S.C. § 371 of International Application No. PCT/KR2020/001810 filed Feb. 10, 2020, which claims the benefit of priority from Korean Patent Application Nos. 10-2019-0015607 filed on Feb. 11, 2019 and 10-2020-0014831 filed on Feb. 7, 2020. The entire contents of these applications are incorporated herein by reference in their entirety.

TECHNICAL FIELD

An embodiment relates to a cooling module.

BACKGROUND ART

Recently, there has been proposed a technology for modularizing a plurality of components in order to improve productivity by simplifying and automating a vehicle assembly process.

Typically, a cooling module for a vehicle includes a radiator, a condenser, and a fan shroud.

FIG. 1 is a perspective view of a cooling module in the related art, and FIG. 2 is an exploded perspective view of FIG. 1.

Referring to FIGS. 1 and 2, a condenser 2 may be coupled to a radiator 1 so as to be slidable in a direction from an upper side to a lower side of the radiator 1. The radiator 1 and the condenser 2 are assembled by coupling brackets 3 and fixing pieces 4 respectively disposed at four points, i.e., upper, lower, left, and right points. For this reason, the addition of assembly components such as the brackets 3 and the fixing pieces 4 causes a problem of increase in production cost.

DISCLOSURE

Technical Problem

An embodiment provides a cooling module with a reduced number of assembly components, which makes it possible to reduce production costs.

The objects to be achieved by the embodiment are not limited to the above-mentioned objects, but also include objects or effects that may be understood from the solutions or embodiments described below.

Technical Solution

A cooling module according to one aspect of the present disclosure may include: a radiator including: first and second header tanks disposed to face each other; and hook parts respectively disposed at upper and lower sides of the first header tank and a lower side of the second header tank; and a condenser including: third and fourth header tanks disposed to face each other; a flange connection part coupled to the third header tank; and a gas-liquid separator coupled to the fourth header tank, in which the condenser may be coupled to the radiator as the flange connection part, the third header tank, and the gas-liquid separator are inserted into the plurality of the hook parts, respectively, in a direction from an upper side to a lower side thereof.

The plurality of the hook parts may include: a first hook part disposed at the upper side of the first header tank; a second hook part disposed at the lower side of the first header tank; and a third hook part disposed at the lower side of the second header tank.

The first hook part may include: a first horizontal portion protruding from an outer circumferential surface of the first header tank; and a first vertical portion extending from an end of the first horizontal portion in an upward direction, and the flange connection part may be inserted into a space between the first header tank and the first vertical portion.

The first hook part may include a first-1 stopper protruding from an end of the first vertical portion toward the first header tank, and the first-1 stopper may have an inclined portion provided at an upper end of an inner surface thereof.

The first hook part may include a first-2 stopper protruding from the outer circumferential surface of the first header tank, and the flange connection part may include a first insertion groove into which the first-2 stopper is inserted.

The first-2 stopper may be disposed between the first horizontal portion and the first-1 stopper.

The first insertion groove may have two opposite ends opened such that the first-2 stopper is coupled to the first insertion groove by sliding in an upward-downward direction.

The second hook part may include: a second horizontal portion protruding from an outer circumferential surface of the first header tank; and a second vertical portion extending from an end of the second horizontal portion in an upward direction, and the third header tank may be inserted into a space between the first header tank and the second vertical portion.

The third header tank may be disposed to be spaced apart upward from the second horizontal portion.

The third header tank may be seated on the second horizontal portion.

The second hook part may include a second stopper protruding from an upper surface of the second horizontal portion, and the third header tank may include a second insertion groove into which the second stopper is inserted.

The third hook part may include: a third horizontal portion protruding from an outer circumferential surface of the second header tank; a third vertical portion extending from an end of the third horizontal portion in an upward direction; and a pair of support pieces protruding from the outer circumferential surface of the second header tank toward the third vertical portion, the gas-liquid separator may be inserted into a space between the second header tank and the third vertical portion, and an outer circumferential surface of the gas-liquid separator may be supported by the third vertical portion and the pair of support pieces which are disposed to be spaced apart from one another in a circumferential direction of the gas-liquid separator.

The gas-liquid separator may be disposed to be spaced apart upward from the third horizontal portion.

The third vertical portion may include: a cut-out portion formed in a 'C' shape; and a support portion formed by the cut-out portion and protruding toward the second header tank.

The radiator may include a fourth hook part disposed at an upper side of the second header tank, the condenser may include a fixing piece protruding from the fourth header tank, and the fixing piece may be inserted into the fourth hook part in the direction from the upper side to the lower side.

The flange connection part may support a pipe connected to the third header tank.

Advantageous Effects

According to the cooling module according to the embodiment, the assembly component such as a bracket or a fixing piece is installed at the single position in comparison with the related art in which the assembly components are installed at four positions including the upper, lower, left, and right sides of the radiator and the condenser. The components of the condenser in the related art at the remaining three positions are replaced with assembly components applied without change or partially changed. Therefore, it is possible to expect an effect of reducing production costs.

The various, beneficial advantages and effects of the present disclosure are not limited to the above-mentioned contents and may be more easily understood during the process of describing the specific embodiments of the present disclosure.

DESCRIPTION OF DRAWINGS

FIG. 17 is a view illustrating a state in which the gas-liquid separator is coupled to the third hook part illustrated in FIG. 15.

DESCRIPTION OF MAIN REFERENCE NUMERALS OF DRAWINGS

Figure 1:
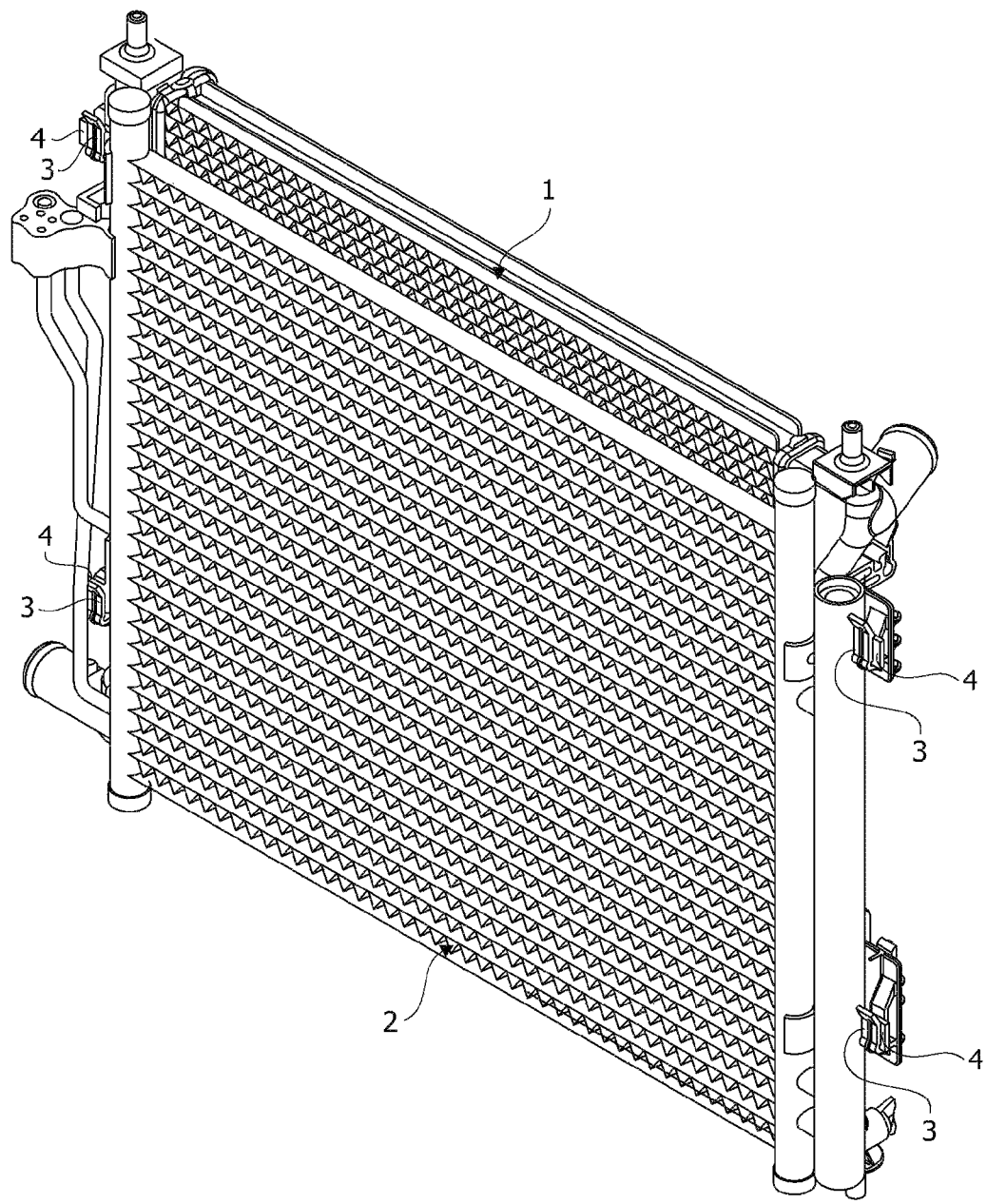
FIG. 1 is a perspective view of a cooling module in the related art.
Figure 2:
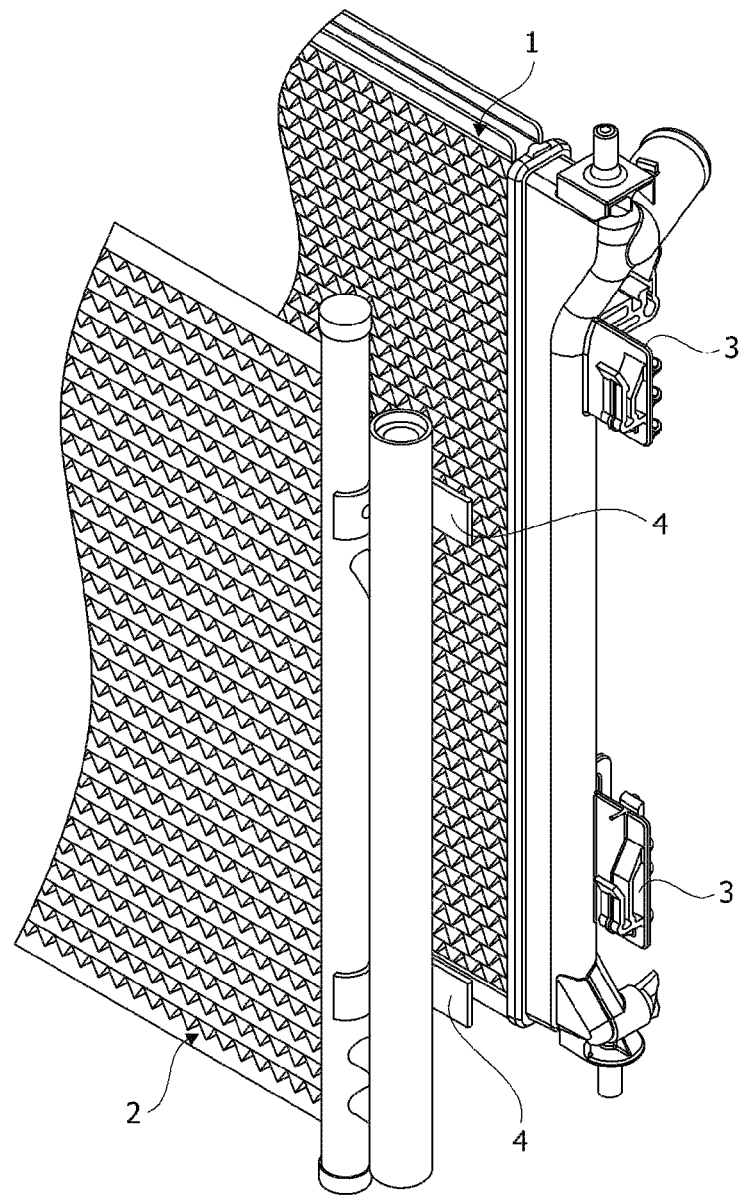
FIG. 2 is an exploded perspective view of FIG. 1.

1: Radiator
2: Condenser
3: Bracket
4: Fixing piece
10: Radiator
20: Condenser
110: First header tank
120: Second header tank
130: First tube
140: First heat radiating fin
210: Third header tank
210a: Second insertion groove
211: Pipe
220: Fourth header tank
221: Fixing piece
230: Second tube
240: Second heat radiating fin
250: Flange connection part
250a: First insertion groove
260: Gas-liquid separator
310: First hook part
311: First horizontal portion
313: First vertical portion
315: First-1 stopper
315a: Inclined portion
317: First-2 stopper
320: Second hook part
321: Second horizontal portion
323: Second vertical portion
325: Second stopper
330: Third hook part
331: Third horizontal portion
333: Third vertical portion
333a: Cut-out portion
333b: Support portion
335: Support piece
340: Fourth hook part

BEST MODE

Hereinafter, an embodiment of the present disclosure will be described with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Figure 3:
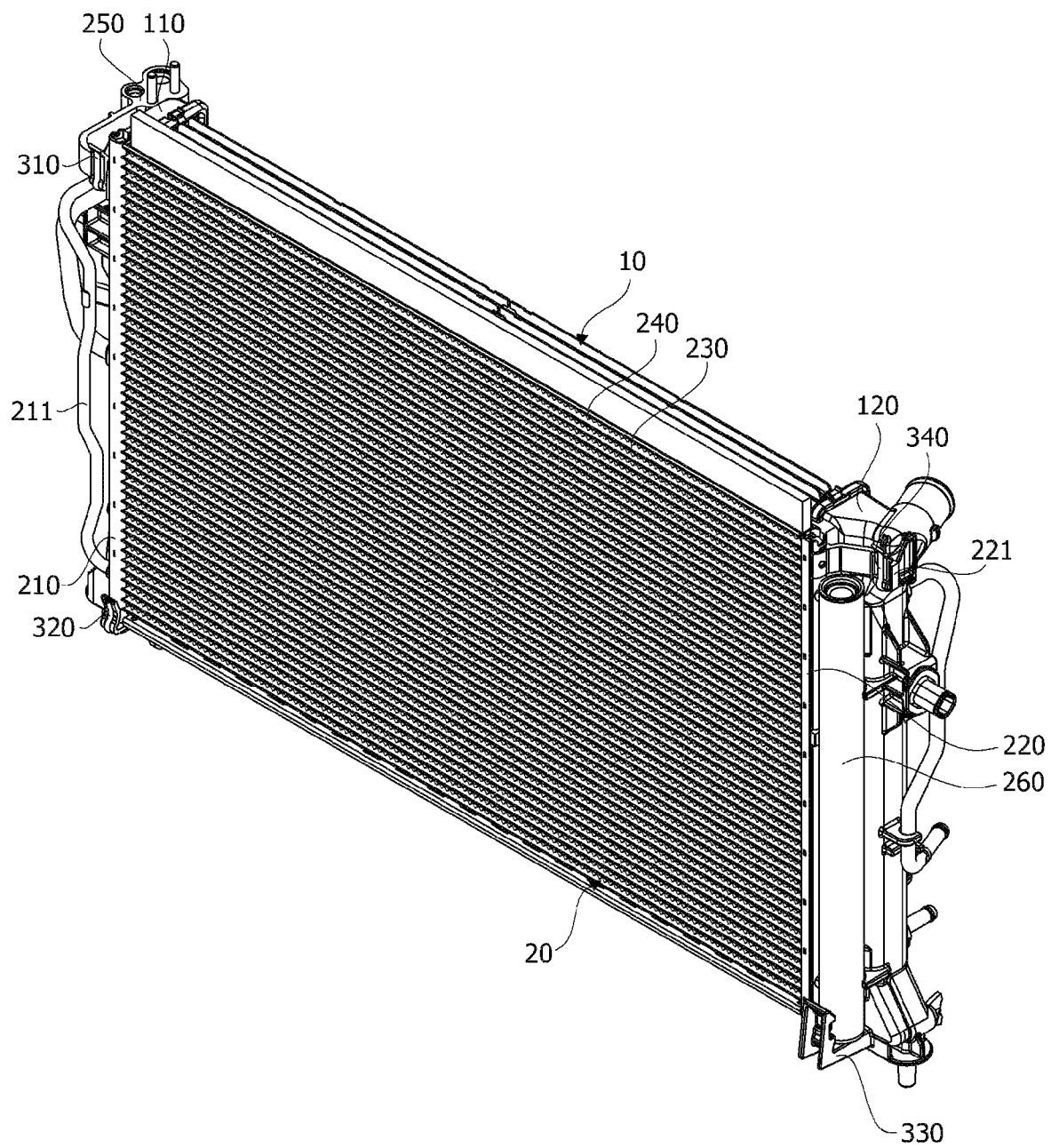
FIG. 3 is a perspective view of a cooling module according to an embodiment of the present disclosure.
Figure 4:
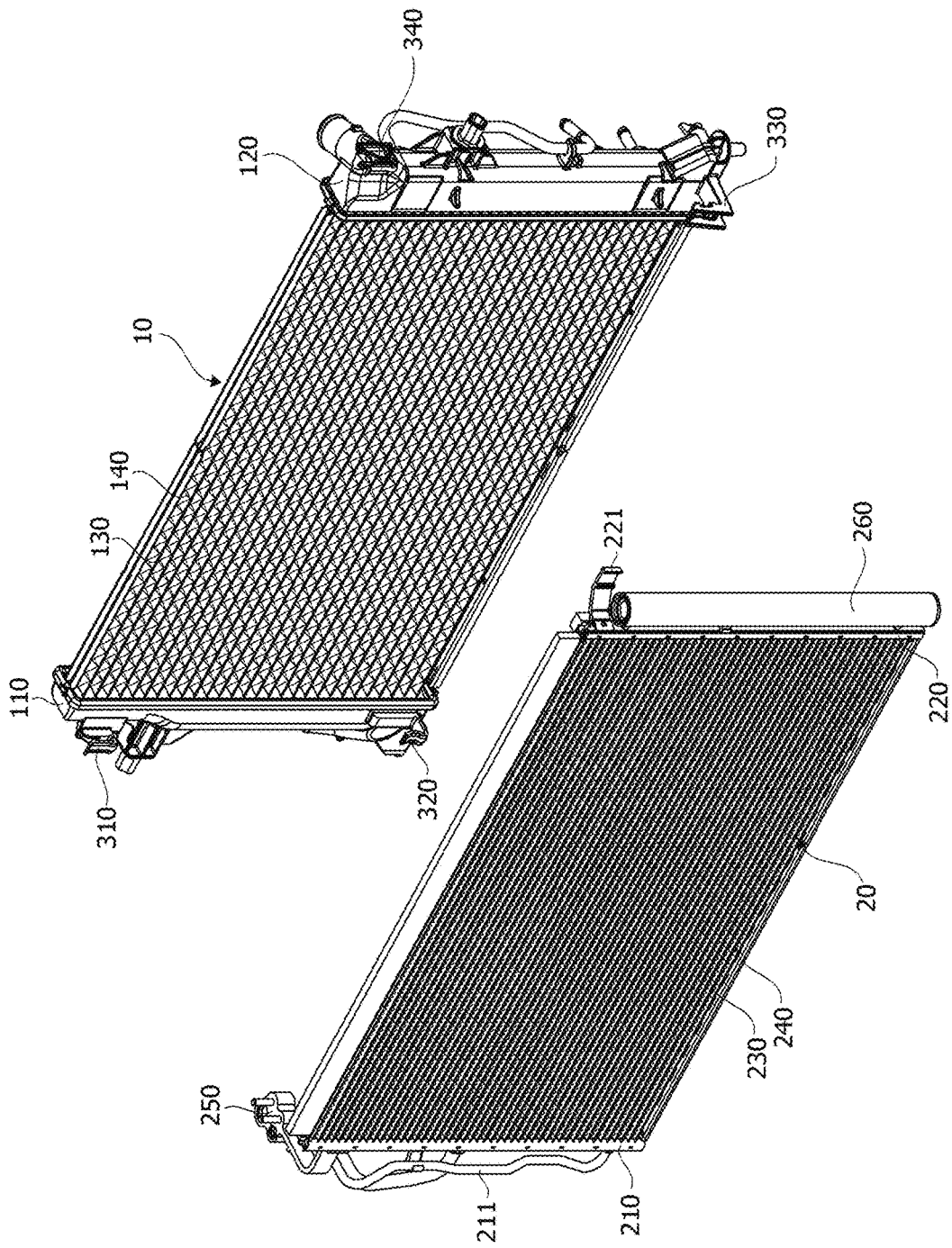
FIG. 4 is an exploded perspective view of FIG. 3.

FIG. 3 is a perspective view of a cooling module according to an embodiment of the present disclosure, and FIG. 4 is an exploded perspective view of FIG. 3.

Referring to FIGS. 3 and 4, the cooling module according to the embodiment of the present disclosure may include a radiator 10 and a condenser 20.

The radiator 10 may include: first and second header tanks 110 and 120 disposed to face each other; a plurality of first tubes 130 each having two opposite ends respectively fixed to the first and second header tanks 110 and 120 and configured to provide a passageway for transmitting a first heat exchange medium; and first heat radiating fins 140 interposed between the plurality of first tubes 130. The first heat exchange medium may be, but not necessarily limited to, a coolant that has passed through an engine mounted in a vehicle.

A first hook part 310 may be disposed at an upper side of the first header tank 110, and a second hook part 320 may be disposed at a lower side of the first header tank 110.

Likewise, a third hook part 330 may be disposed at a lower side of the second header tank 120, and a fourth hook part 340 may be disposed at an upper side of the second header tank 120.

The condenser 20 may include: third and fourth header tanks 210 and 220 disposed to face each other; a plurality of second tubes 230 each having two opposite ends respectively fixed to the third and fourth header tanks 210 and 220 and configured to provide a passageway for transmitting a second heat exchange medium; second heat radiating fins 240 interposed between the plurality of second tubes 230; a flange connection part 250 coupled to the third header tank 210; and a gas-liquid separator 260 coupled to the fourth header tank 220. The second heat exchange medium may be a refrigerant that has passed through an evaporator of an air conditioning device for a vehicle.

A fixing piece 221 may protrude from an outer circumferential surface at an upper side of the fourth header tank 220.

The flange connection part 250 may support pipes 211 connected to the third header tank 210. The pipes 211 may be connected to a refrigerant transmission pipe (not illustrated) of the air conditioning device for a vehicle through the flange connection part 250. The pipes 211 may include a refrigerant inlet pipe and a refrigerant discharge pipe.

The condenser 20 may be coupled to the radiator 10 in a direction from an upper side to a lower side of the radiator 10. Specifically, the condenser 20 may be coupled to the radiator 10 as the flange connection part 250 is inserted into the first hook part 310, the third header tank 210 is inserted into the second hook part 320, the gas-liquid separator 260 is inserted into the third hook part 330, and the fixing piece 221 is inserted into the fourth hook part 340 while the condenser 20 moves in the direction from the upper side to the lower side of the radiator 10.

Figure 5:
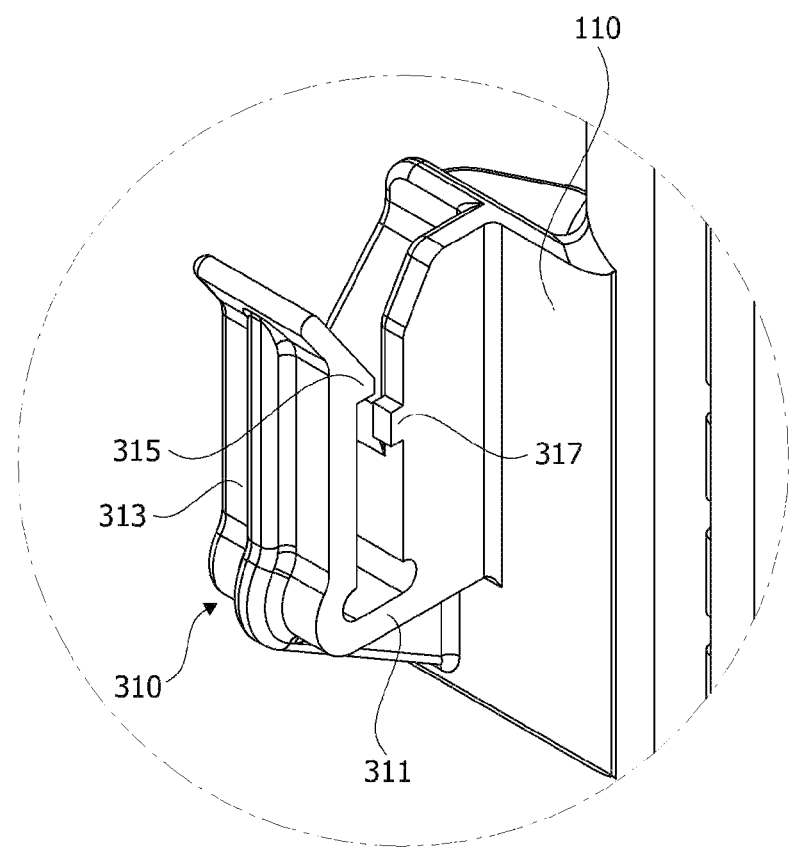
FIG. 5 is an enlarged view of a first hook part illustrated in FIG. 4.
Figure 6:
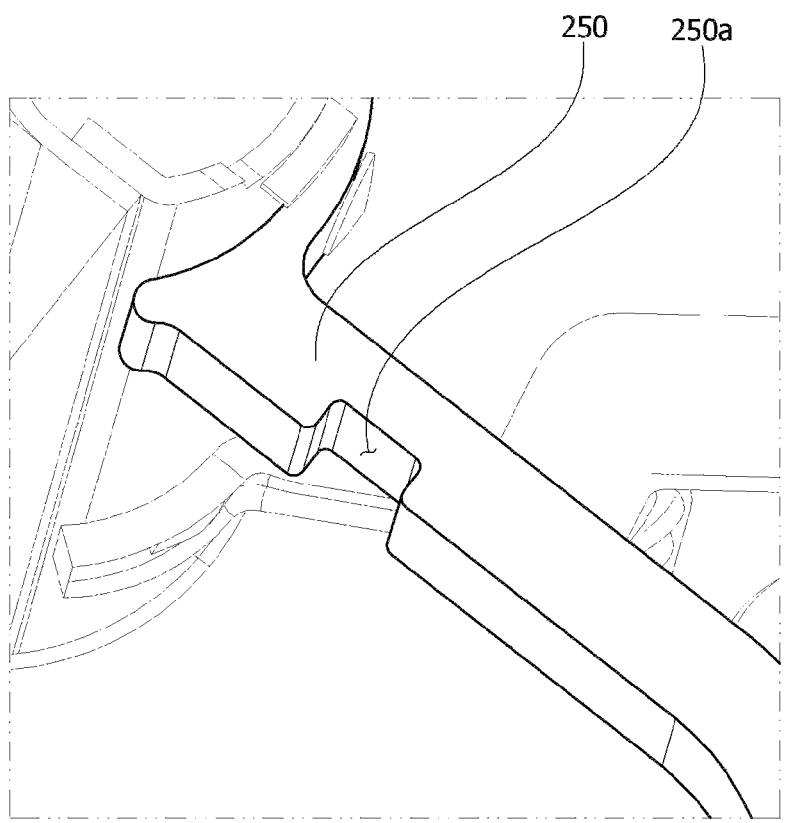
FIG. 6 is a view illustrating a structure of a flange connection part illustrated in FIG. 4.
Figure 7:
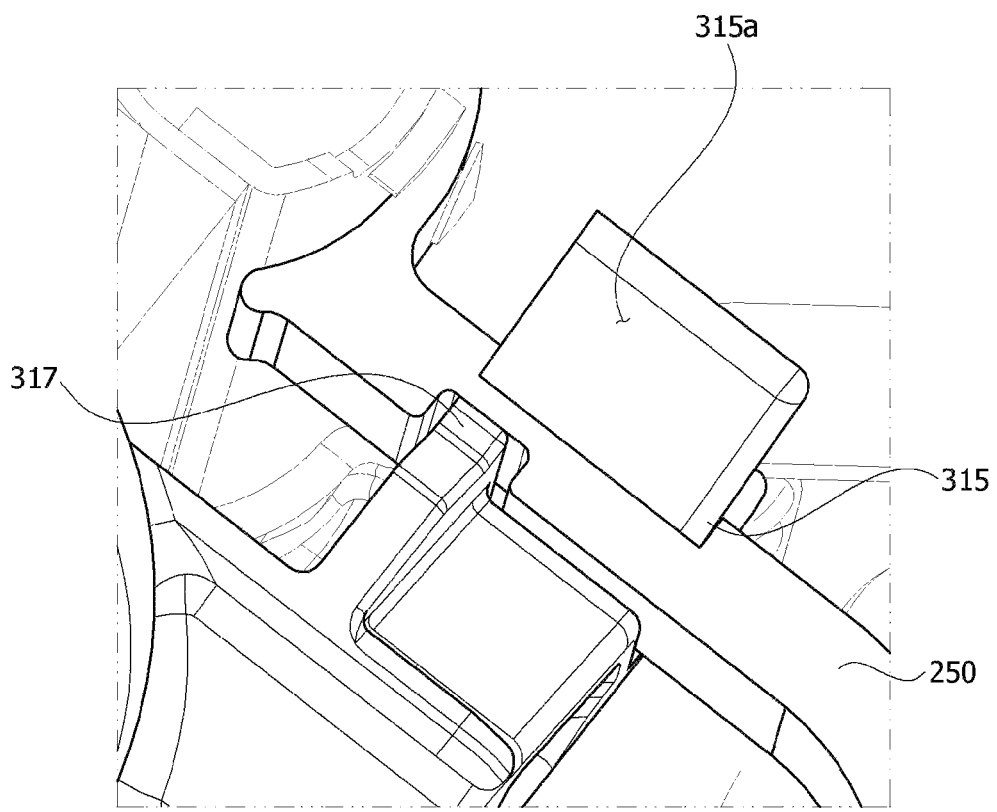
FIG. 7 is a view illustrating a structure in which the flange connection part is coupled to the first hook part illustrated in FIG. 5.

FIG. 5 is an enlarged view of the first hook part illustrated in FIG. 4, FIG. 6 is a view illustrating a structure of the flange connection part illustrated in FIG. 4, and FIG. 7 is a view illustrating a structure in which the flange connection part is coupled to the first hook part illustrated in FIG. 5.

Referring to FIGS. 5 to 7, the first hook part 310 may include a first horizontal portion 311, a first vertical portion 313, a first-1 stopper 315, and a first-2 stopper 317.

The first horizontal portion 311 may protrude from an outer circumferential surface at the upper side of the first header tank 110 in a horizontal direction, for example, in a diameter direction of the first header tank 110.

The first vertical portion 313 may extend from an end of the first horizontal portion 311 in an upward direction, for example, in a longitudinal direction of the first header tank 110. Therefore, a space may be defined between the first header tank 110 and the first vertical portion 313, and the flange connection part 250 may be inserted into the space.

The first-1 stopper 315 may protrude from an upper end of the first vertical portion 313 toward the first header tank 110. Therefore, the first-1 stopper 315 may prevent the withdrawal of the flange connection part 250 inserted into the space between the first header tank 110 and the first vertical portion 313.

The first-1 stopper 315 may have an inclined portion 315a formed at an upper end of an inner surface thereof.

The inclined portion 315a may have an acute angle with respect to the outer circumferential surface of the first header tank 110. Therefore, the flange connection part 250 may be more easily inserted into the space. Meanwhile, the first vertical portion 313 may be bent and deformed when the inclined portion 315a is pressed during the process of inserting the flange connection part 250. When the flange connection part 250 is completely inserted, the first vertical portion 313 may be restored to an original state by an elastic force.

The first-2 stopper 317 may protrude from the outer circumferential surface of the first header tank 110 toward the first vertical portion 313. The first-2 stopper 317 may be inserted into a first insertion groove 250a formed in the flange connection part 250. Therefore, the forward and rearward motions of the flange connection part 250 may be restricted by the first vertical portion 313, the upward and downward motions of the flange connection part 250 may be restricted by the first-1 stopper 315, and the leftward and rightward motions of the flange connection part 250 may be restricted by the first-2 stopper 317.

The first-2 stopper 317 may be disposed between the first horizontal portion 311 and the first-1 stopper 315 in the upward-downward direction, for example, in the longitudinal direction of the first header tank 110.

The first insertion groove 250a formed in the flange connection part 250 may have two opposite ends opened in the upward-downward direction, for example, in the longitudinal direction of the first header tank 110, such that the first-2 stopper 317 may be coupled to the first insertion groove 250a by sliding in the upward-downward direction, for example, in the longitudinal direction of the first header tank 110.

Figure 8:
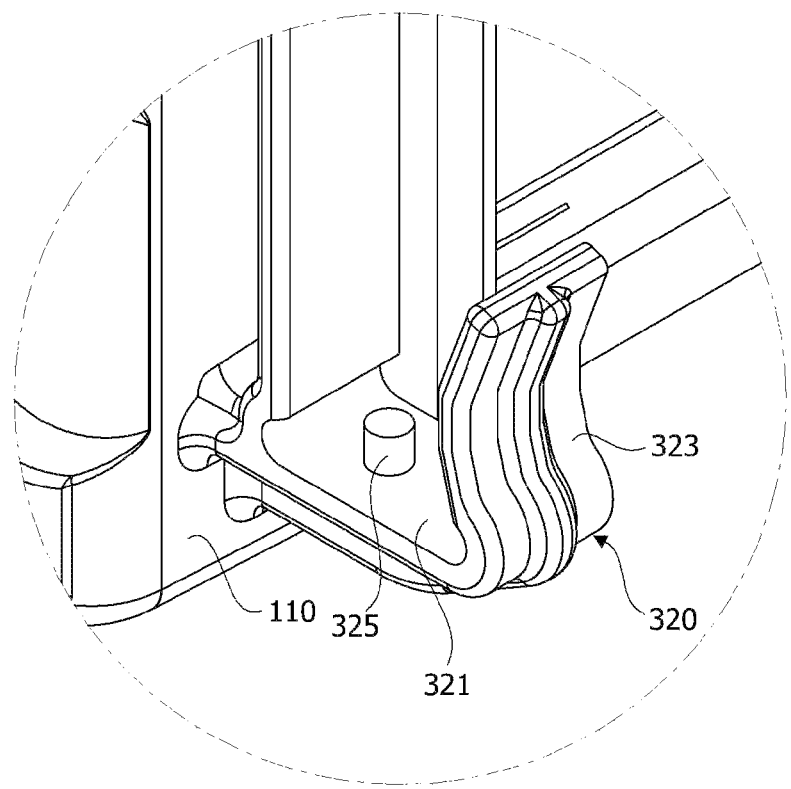
FIG. 8 is an enlarged view of a second hook part illustrated in FIG. 4.
Figure 9:
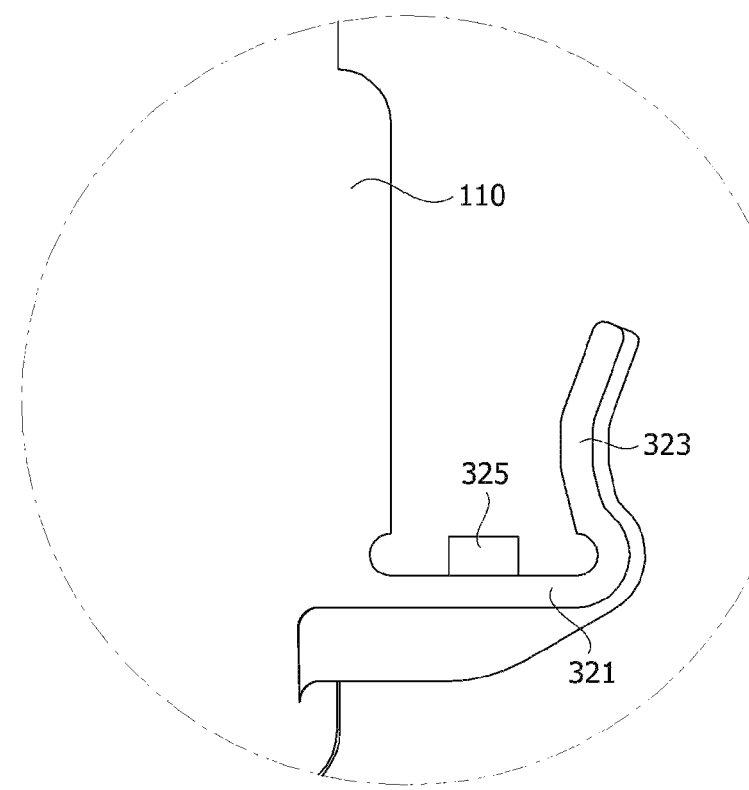
FIG. 9 is a side view of FIG. 8.
Figure 10:
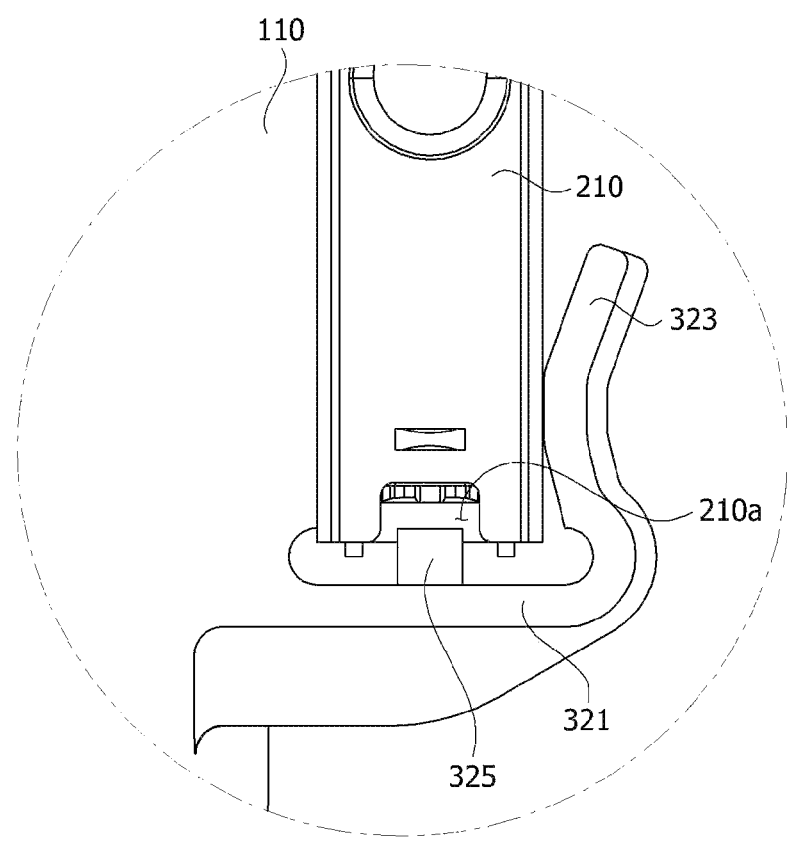
FIG. 10 is a view illustrating a state in which a third header tank is coupled to the second hook part illustrated in FIG. 9.

FIG. 8 is an enlarged view of the second hook part illustrated in FIG. 4, FIG. 9 is a side view of FIG. 8, and FIG. 10 is a view illustrating a state in which the third header tank is coupled to the second hook part illustrated in FIG. 9.

Referring to FIGS. 8 to 10, the second hook part 320 may include a second horizontal portion 321, a second vertical portion 323, and a second stopper 325.

The second horizontal portion 321 may protrude from an outer circumferential surface at the lower side of the first header tank 110 in the horizontal direction, for example, in the diameter direction of the first header tank 110.

The second vertical portion 323 may extend from an end of the second horizontal portion 321 in the upward direction, for example, in the longitudinal direction of the first header tank 110. Therefore, a space may be defined between the first header tank 110 and the second vertical portion 323, and the third header tank 210 may be inserted into the space.

In this case, the third header tank 210 may be seated on an upper surface of the second horizontal portion 321.

However, the present disclosure is not necessarily limited thereto, and the third header tank 210 may be disposed to be spaced apart upward from the second horizontal portion 321. For example, the flange connection part 250 may be seated on the first horizontal portion 311, whereas a gap may be formed between the third header tank 210 and the second horizontal portion 321. Therefore, the cooling module may be more easily assembled even when tolerance occurs during the assembly process.

The second stopper 325 may protrude from the upper surface of the second horizontal portion 321. The second stopper 325 may be inserted into a second insertion groove 210a formed in a lower surface of the third header tank 210. Therefore, the forward and rearward motions of the third header tank 210 may be restricted by the second vertical portion 323, and the leftward and rightward motions of the third header tank 210 may be restricted by the second stopper 325.

The second insertion groove 210a may be shaped such that one end in the leftward-rightward direction thereof is opened and the other end is closed.

Figure 11:
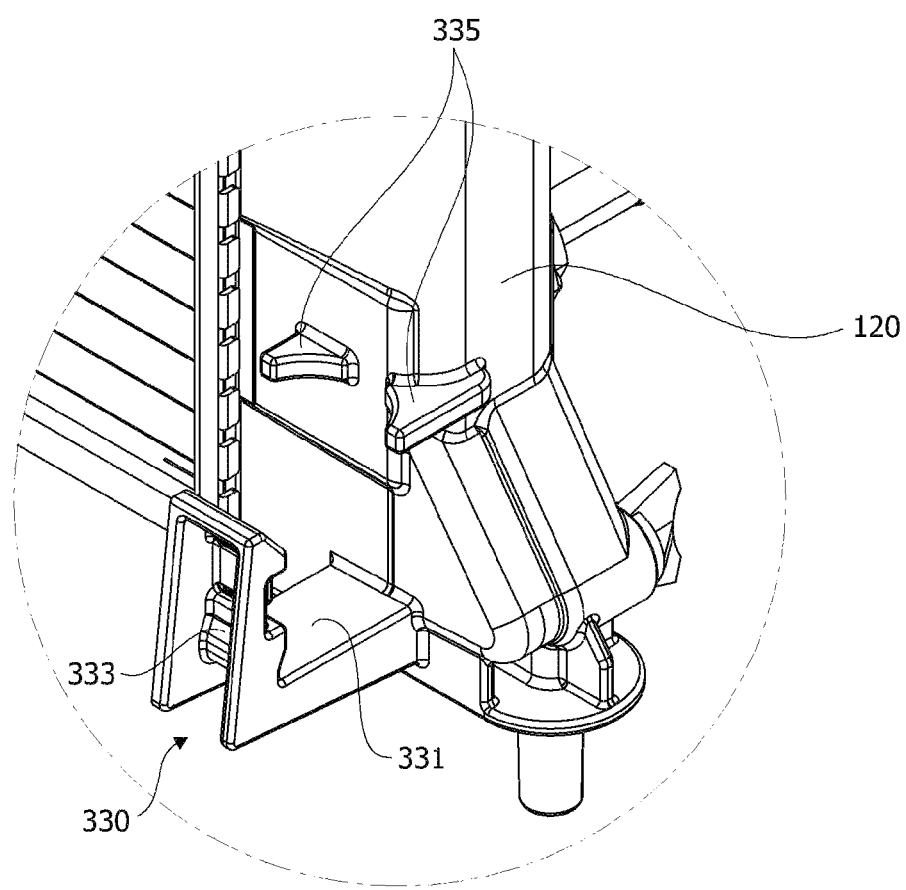
FIG. 11 is an enlarged view of a third hook part illustrated in FIG. 4.
Figure 12:
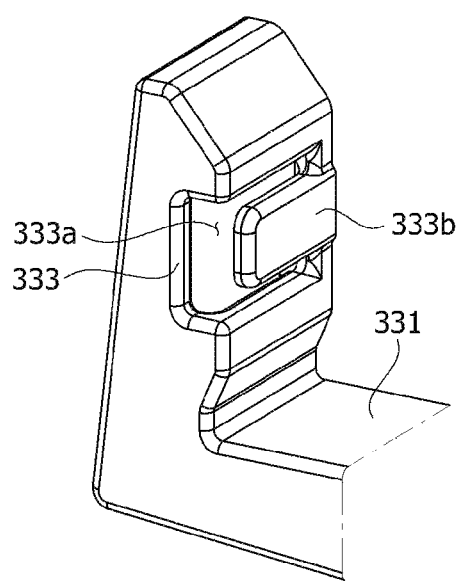
FIG. 12 is a perspective view of FIG. 11 in another direction.
Figure 13:
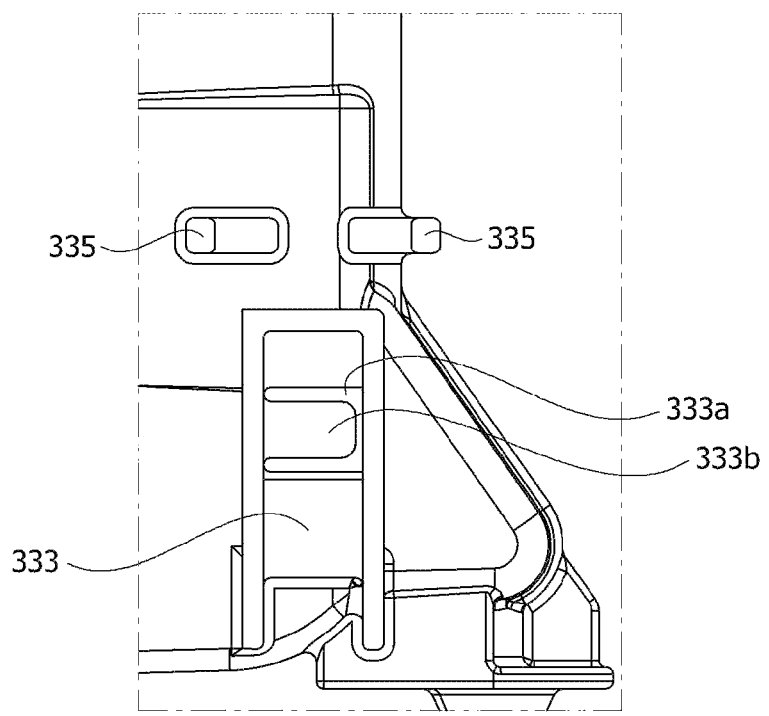
FIG. 13 is a front view of FIG. 11.
Figure 14:
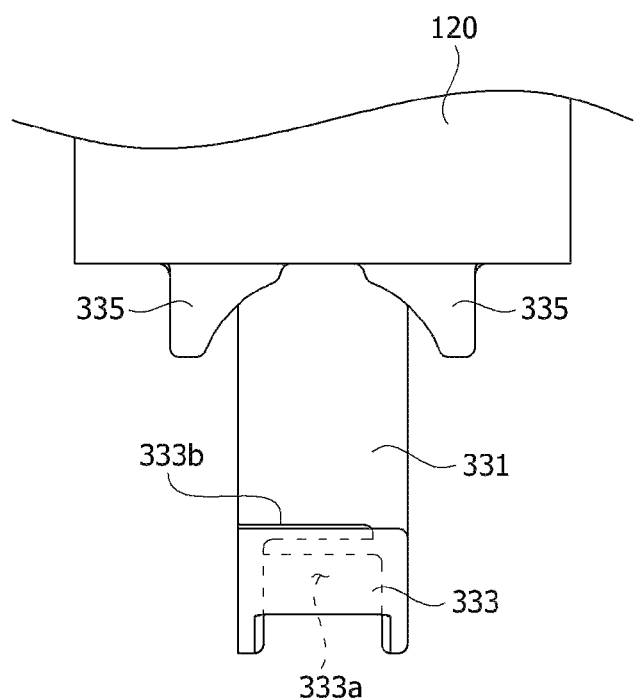
FIG. 14 is a top plan view of FIG. 11.
Figure 15:
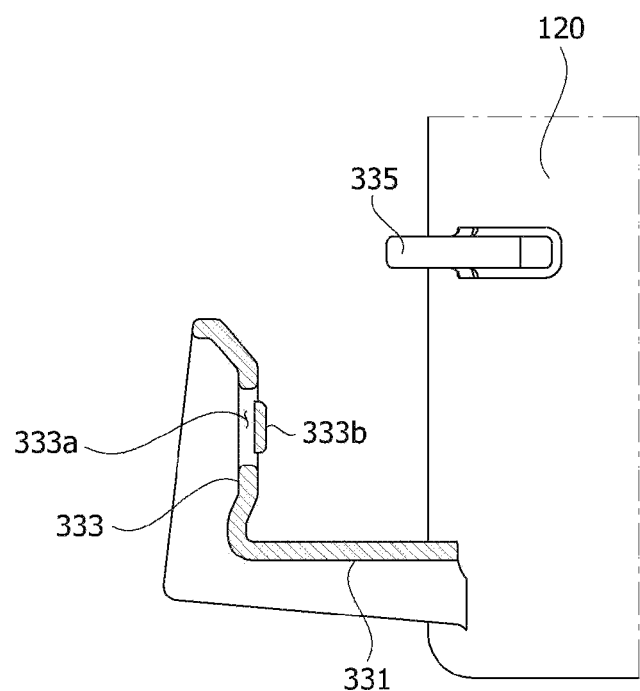
FIG. 15 is a vertical cross-sectional view of FIG. 11.
Figure 16:
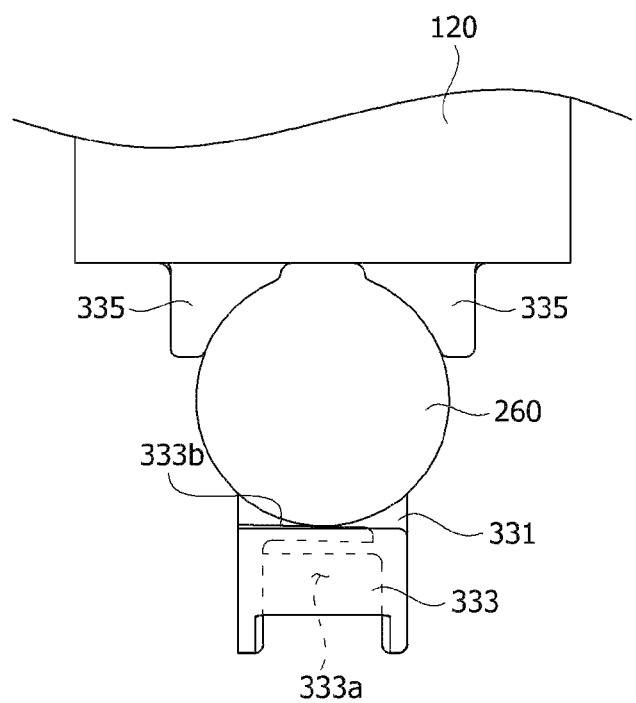
FIG. 16 is a view illustrating a state in which a gas-liquid separator is coupled to the third hook part illustrated in FIG. 14.

FIG. 11 is an enlarged view of the third hook part illustrated in FIG. 4, FIG. 12 is a perspective view of FIG. 11 in another direction, FIG. 13 is a front view of FIG. 11, FIG. 14 is a top plan view of FIG. 11, FIG. 15 is a vertical cross-sectional view of FIG. 11, FIG. 16 is a view illustrating a state in which the gas-liquid separator is coupled to the third hook part illustrated in FIG. 14, and FIG. 17 is a view illustrating a state in which the gas-liquid separator is coupled to the third hook part illustrated in FIG. 15.

Referring to FIGS. 11 to 17, the third hook part 330 may include a third horizontal portion 331, a third vertical portion 333, and a pair of support pieces 335.

The third horizontal portion 331 may protrude from an outer circumferential surface at the lower side of the second header tank 120 in the horizontal direction, for example, in a diameter direction of the second header tank 120.

The third vertical portion 333 may extend from an end of the third horizontal portion 331 in the upward direction, for example, in a longitudinal direction of the second header tank 120. Therefore, a space may be defined between the second header tank 120 and the third vertical portion 333, and the gas-liquid separator 260 may be inserted into the space.

The pair of support pieces 335 may protrude from the outer circumferential surface of the second header tank 120 toward the third vertical portion 333. The pair of support pieces 335 may be disposed to be spaced apart from each other in the horizontal direction.

The support piece 335 may be disposed at a higher position than the third vertical portion 333.

The pair of support pieces 335, together with the third vertical portion 333, may support an outer circumferential surface of the gas-liquid separator 260. In this case, the third vertical portion 333 and the pair of support pieces 335 are disposed to be spaced apart from one another in a circumferential direction of the gas-liquid separator 260, such that the gas-liquid separator 260 may be stably supported at three points even though the gas-liquid separator 260 has a cylindrical shape. Therefore, the forward and rearward motions and the leftward and rightward motions of the gas-liquid separator 260 may be restricted by the third vertical portion 333 and the pair of support pieces 335.

The gas-liquid separator 260 may be disposed to be spaced apart upward from the third horizontal portion 331. For example, the fixing piece 221 may be seated on a fourth horizontal portion of the fourth hook part 340, whereas a gap may be formed between the gas-liquid separator 260 and the third horizontal portion 331. Therefore, the cooling module may be more easily assembled even when tolerance occurs during the assembly process. However, the present disclosure is not necessarily limited thereto, and the gas-liquid separator 260 may be seated on the third horizontal portion 331.

The third vertical portion 333 may include a cut-out portion 333a formed in a 'C' shape, and a support portion 333b formed by the cut-out portion 333a and protruding toward the second header tank 120.

The support portion 333b may be bent and deformed during the process of inserting the gas-liquid separator 260. The support portion 333b may support the gas-liquid separator 260 by being brought into close contact with the outer circumferential surface of the gas-liquid separator 260 by an elastic force.

The third vertical portion 333 may have an inclined portion at an upper end of an inner surface thereof. The support portion 333b may have an inclined portion at an upper end of an inner surface thereof. Therefore, the gas-liquid separator 260 may be more easily inserted.

While the exemplary embodiments of the present disclosure have been described above, those skilled in the art may variously modify and change the present disclosure by adding, changing, deleting, or modifying constituent elements without departing from the spirit of the present disclosure disclosed in the claims, and the modification and change also belong to the scope of the present disclosure.

The invention claimed is:

1. A cooling module comprising:
a radiator comprising:
first and second header tanks disposed to face each other; and
hook parts respectively disposed at upper and lower sides of the first header tank and a lower side of the second header tank; and
a condenser comprising:
third and fourth header tanks disposed to face each other;
a flange connection part coupled to the third header tank; and
a gas-liquid separator coupled to the fourth header tank,
wherein the condenser is coupled to the radiator as the flange connection part, the third header tank, and the gas-liquid separator are inserted into the plurality of the hook parts, respectively, in a direction from an upper side to a lower side thereof,
wherein the plurality of the hook parts comprises:
a first hook part disposed at the upper side of the first header tank; and
a third hook part disposed at the lower side of the second header tank,
wherein the first hook part comprises:
a first horizontal portion protruding from an outer circumferential surface of the first header tank; and
a first vertical portion extending from an end of the first horizontal portion in an upward direction, and
wherein the flange connection part is inserted into a space between the first header tank and the first vertical portion, wherein the first hook part comprises a first-1 stopper protruding from an end of the first vertical portion toward the first header tank, and the first-1 stopper has an inclined portion provided at an upper end of an inner surface thereof, wherein the forward and rearward motions of the flange connection part are restricted by the first vertical portion, the upward and downward motions of the flange connection part are restricted by the first-1 stopper.

2. The cooling module of claim 1, wherein the plurality of the hook parts comprises:
a second hook part disposed at the lower side of the first header tank.

3. The cooling module of claim 1, wherein the first hook part comprises a first-2 stopper protruding from the outer circumferential surface of the first header tank, and the flange connection part comprises a first insertion groove into which the first-2 stopper is inserted.

4. The cooling module of claim 3, wherein the first-2 stopper is disposed between the first horizontal portion and the first-1 stopper.

5. The cooling module of claim 3, wherein the first insertion groove has two opposite ends opened such that the first-2 stopper is coupled to the first insertion groove by sliding in an upward-downward direction.

6. The cooling module of claim 2, wherein the second hook part comprises:
a second horizontal portion protruding from an outer circumferential surface of the first header tank; and
a second vertical portion extending from an end of the second horizontal portion in an upward direction, and
wherein the third header tank is inserted into a space between the first header tank and the second vertical portion.

7. The cooling module of claim 6, wherein the third header tank is disposed to be spaced apart upward from the second horizontal portion.

8. The cooling module of claim 6, wherein the third header tank is seated on the second horizontal portion.

9. The cooling module of claim 6, wherein the second hook part comprises a second stopper protruding from an upper surface of the second horizontal portion, and the third header tank comprises a second insertion groove into which the second stopper is inserted.

10. The cooling module of claim 2, wherein the third hook part comprises:
a third horizontal portion protruding from an outer circumferential surface of the second header tank;
a third vertical portion extending from an end of the third horizontal portion in an upward direction; and
a pair of support pieces protruding from the outer circumferential surface of the second header tank toward the third vertical portion,
wherein the gas-liquid separator is inserted into a space between the second header tank and the third vertical portion, and
wherein an outer circumferential surface of the gas-liquid separator is supported by the third vertical portion and the pair of support pieces which are disposed to be spaced apart from one another in a circumferential direction of the gas-liquid separator.

11. The cooling module of claim 10, wherein the gas-liquid separator is disposed to be spaced apart upward from the third horizontal portion.

12. The cooling module of claim 10, wherein the third vertical portion comprises:
a cut-out portion formed in a C shape; and
a support portion formed by the cut-out portion and protruding toward the second header tank.

13. The cooling module of claim 1, wherein the radiator comprises a fourth hook part disposed at an upper side of the second header tank, the condenser comprises a fixing piece protruding from the fourth header tank, and the fixing piece is inserted into the fourth hook part in the direction from the upper side to the lower side.

14. The cooling module of claim 1, wherein the flange connection part supports a pipe connected to the third header tank.

* * * * *